United States Patent [19]

Masuzawa et al.

[11] Patent Number: 4,470,751
[45] Date of Patent: Sep. 11, 1984

[54] APPARATUS FOR ATTACHING FRONT LOADER TO VEHICLE

[75] Inventors: Motomu Masuzawa; Haruo Watanabe; Mikio Ishida; Akio Hamada, all of Sakai, Japan

[73] Assignee: Kubota, Ltd., Osaka, Japan

[21] Appl. No.: 384,412

[22] Filed: Jun. 2, 1982

[30] Foreign Application Priority Data

Jul. 3, 1981 [JP] Japan ................. 56-104677
Jul. 3, 1981 [JP] Japan ................ 56-99741[U]

[51] Int. Cl.³ .......................................... B66F 9/06
[52] U.S. Cl. ................................ 414/686; 403/379; 172/274
[58] Field of Search .............. 414/686; 403/378, 379, 403/324; 172/274, 272

[56] References Cited

U.S. PATENT DOCUMENTS

| | | | |
|---|---|---|---|
| 2,973,982 | 3/1961 | Elting et al. | 403/379 X |
| 3,534,640 | 10/1970 | Macy | 403/378 X |
| 3,833,136 | 9/1974 | Spicer et al. | 414/686 |
| 3,949,889 | 4/1976 | Moe | 172/272 X |
| 4,257,730 | 3/1981 | Kawakita | 414/686 |
| 4,280,783 | 7/1981 | Hayward | 414/686 |
| 4,345,870 | 8/1982 | Anderson et al. | 414/686 |

Primary Examiner—Robert J. Spar
Assistant Examiner—Donald W. Underwood
Attorney, Agent, or Firm—Armstrong, Nikaido, Marmelstein & Kubovcik

[57] ABSTRACT

An apparatus for attaching a front loader to a tractor or like vehicle comprises a pair of opposite lift arms removably connectable to the vehicle and pivotally movable upward and downward, a bucket supported by the front ends of the lift arms with pivots and pivotally movable upward and downward, bucket cylinders for pivotally moving the bucket, and a restraining member removably attached to the bucket for preventing the pivotal movement of the bucket relative to the ground. The lift arms as disconnected from the vehicle are moved by the bucket cylinders about the pivots to an attached position relative to the vehicle or to a removed position above the attached position and can be held in either position.

16 Claims, 21 Drawing Figures

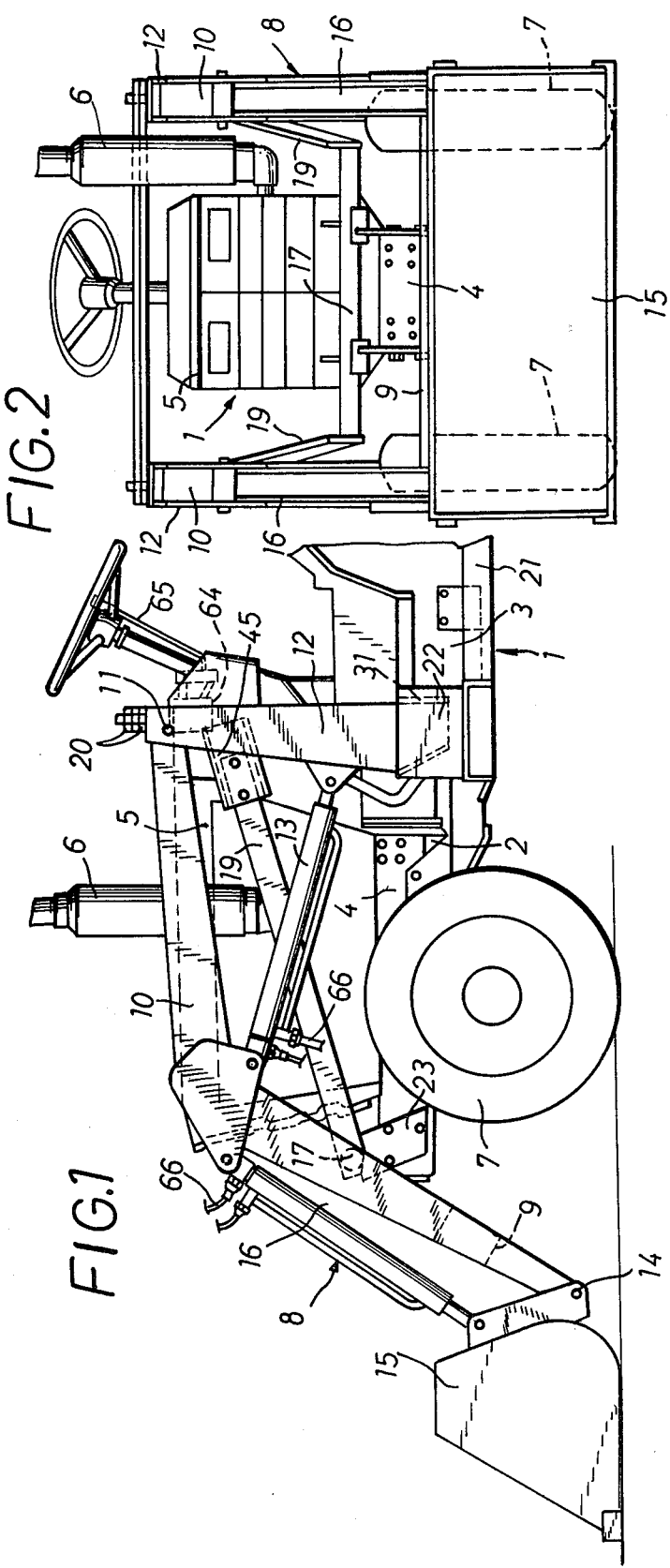

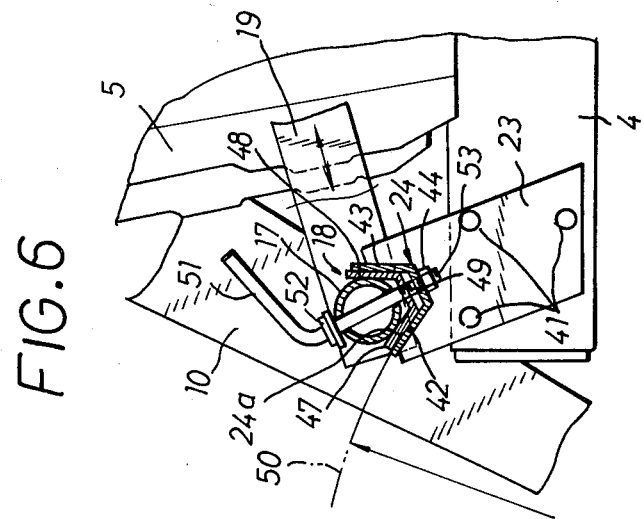
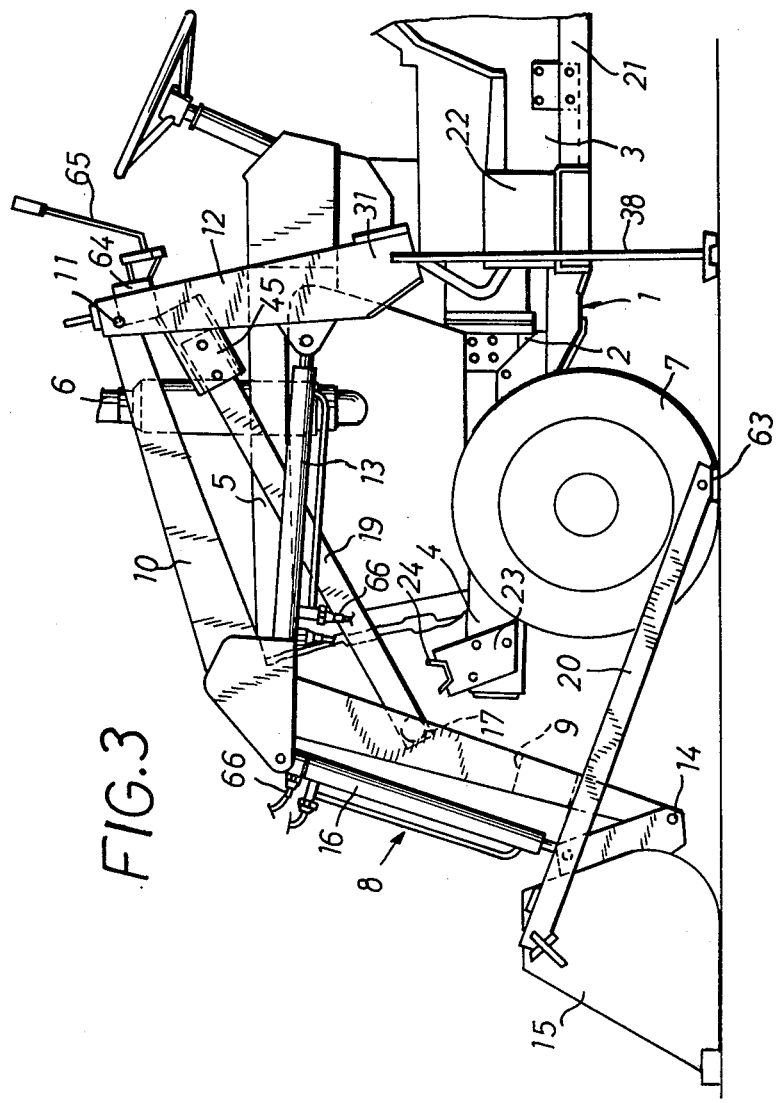

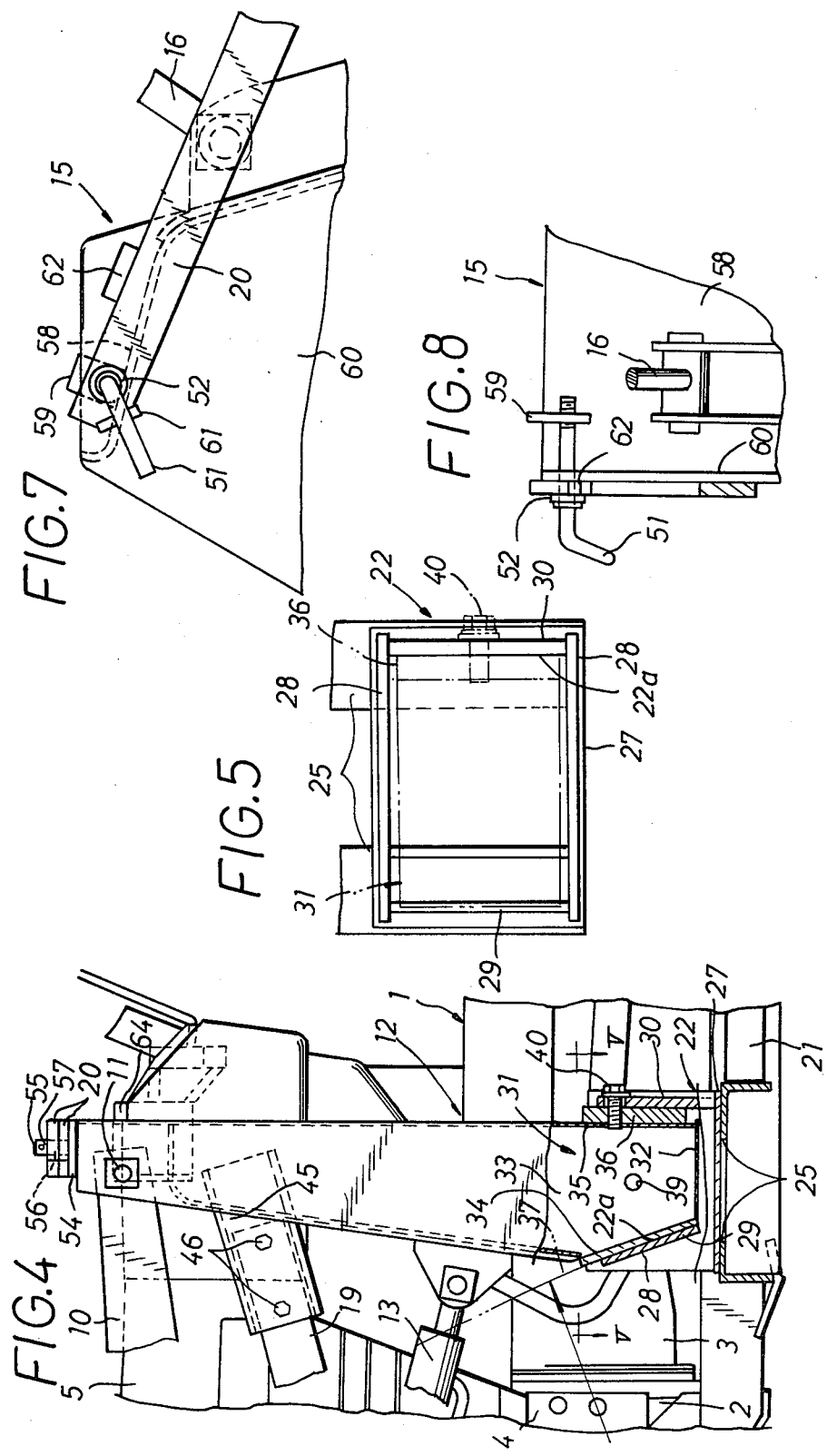

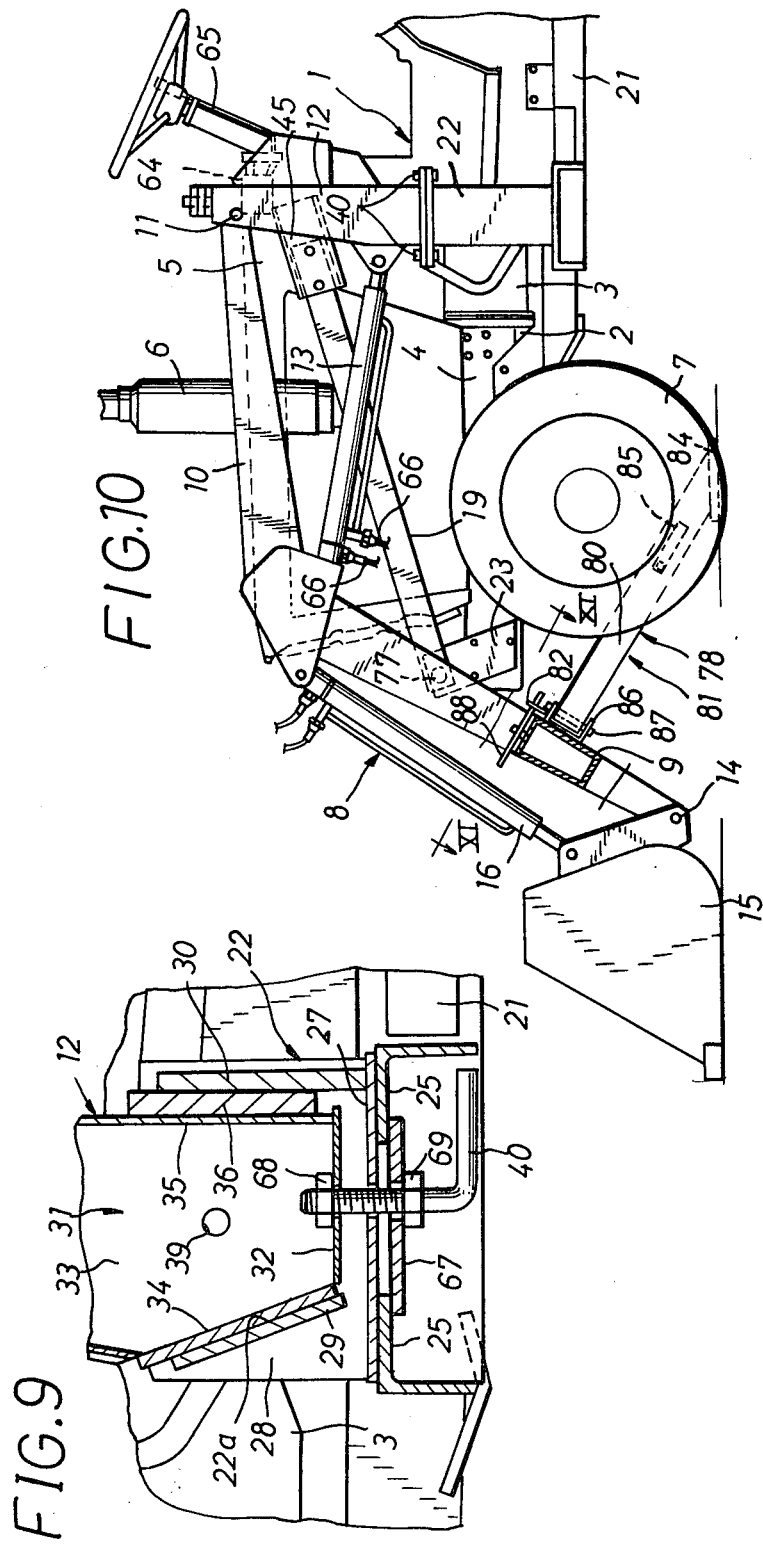

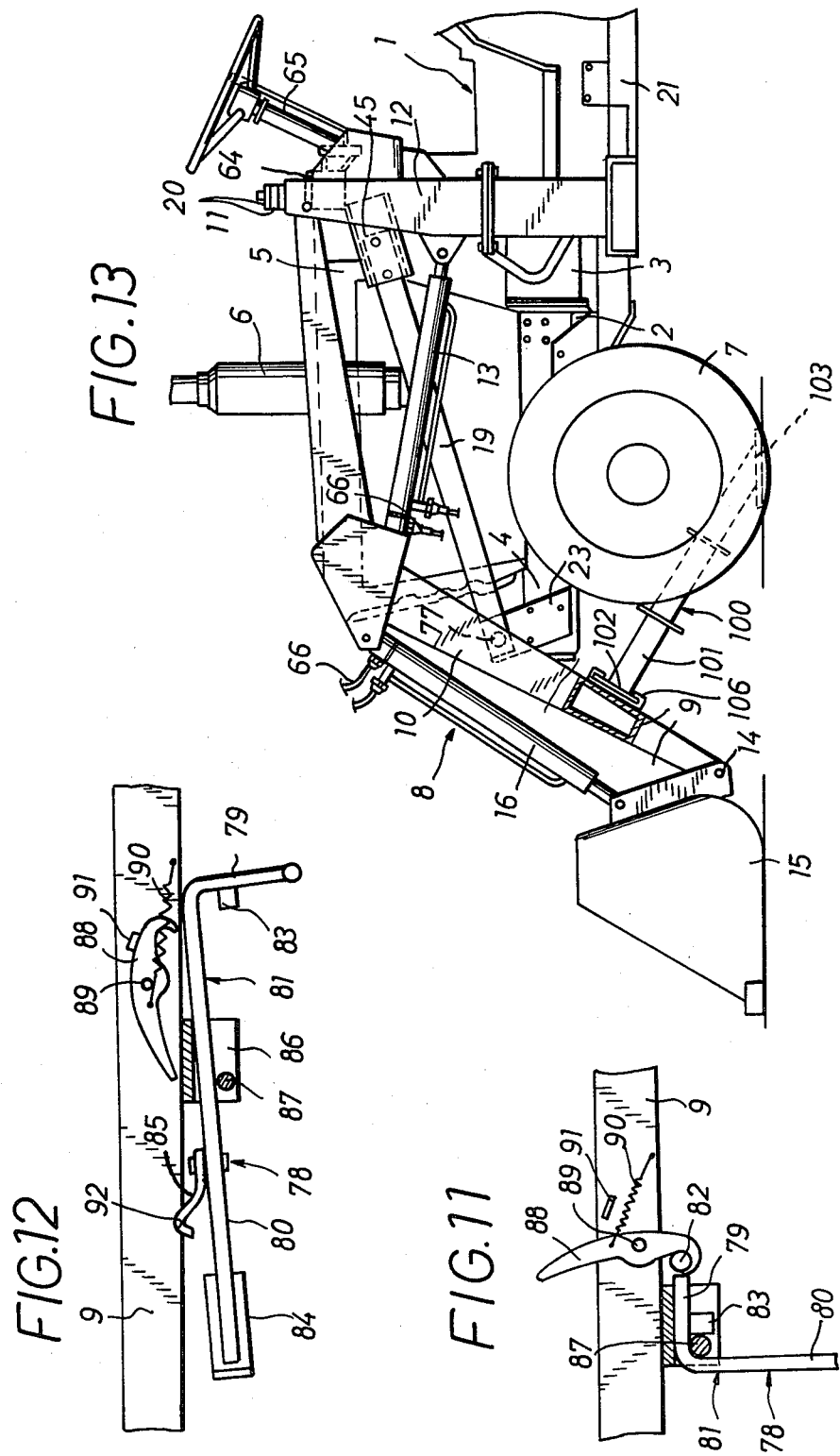

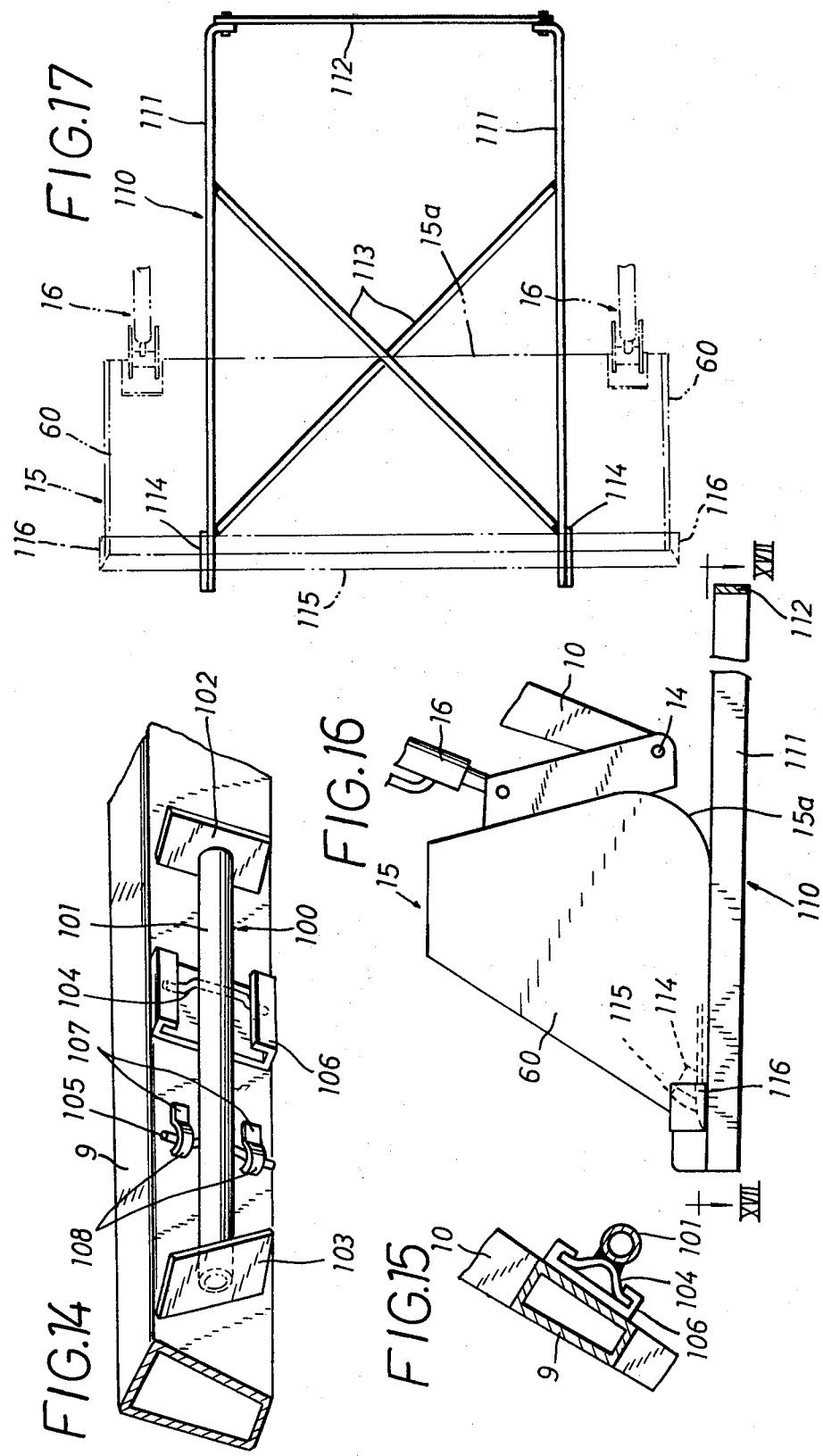

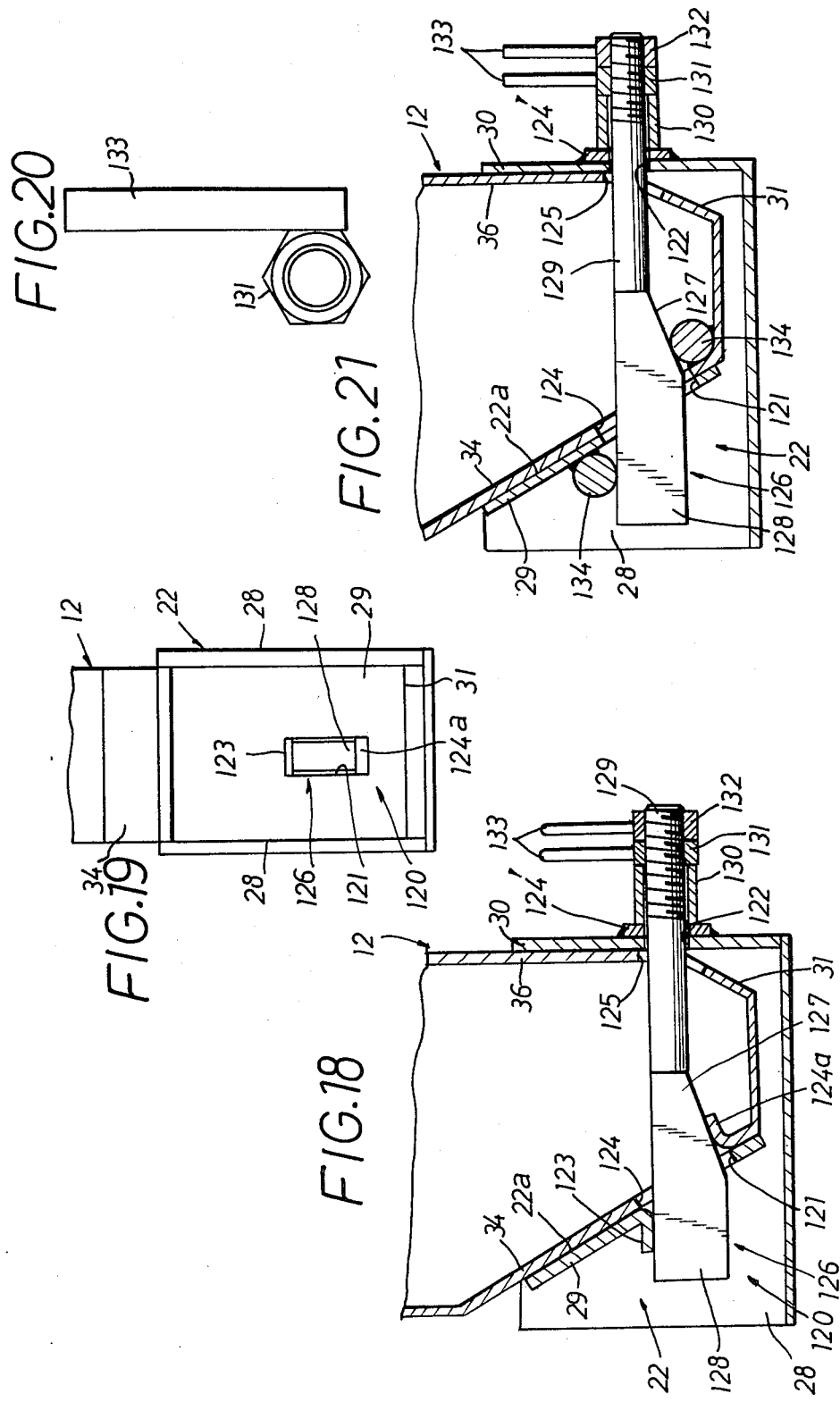

APPARATUS FOR ATTACHING FRONT LOADER TO VEHICLE

BACKGROUND OF THE INVENTION

The present invention relates to an apparatus for attaching a front loader to a vehicle such as a tractor.

The front loader is provided with attaching members each at the base portion of each of a pair of lift arms, and the two attaching members are connected to support members provided on the opposite sides of a vehicle, whereby the front loader is removably attached to the vehicle. To lower the center of gravity of the front loader, the portions of the vehicle to which the attaching members are connected are at a low level, so that when the front loader is attached to or removed from the vehicle, the attaching members must be lifted so as not to interfere with the front wheels. Accordingly the opposite lift arms or the opposite attaching members are usually provided with a pair of jacks, by which the attaching members are lifted for the attachment or removal. However, this involves the problem that the front loader is not easily attachable to or removable from the vehicle since the jacks are cumbersome to handle. There is another problem in that it is troublesome to prepare the two jacks for the purpose of attaching and removal.

Further while it is necessary to hold the attaching members at a predetermined level when the front loader is to be attached to or removed from the vehicle, the jacks, which are not designed specifically for the front loader, are complex in construction and unable to hold the members stably.

The attaching members are connected to the support members by known flanges, bolts, etc., but it is cumbersome, for example, to bring the opposed flanges in register.

Although the connection between the front loader and the vehicle is not sufficiently strong, an attempt to give increased strength to the connection renders the attaching apparatus large-sized and more cumbersome to handle.

SUMMARY OF THE INVENTION

An object of the present invention is to render a front loader attachable to and removable from a tractor or like vehicle with greater ease. Stated more specifically, front loaders generally comprise lift arms which are supported by a vehicle upwardly and downwardly movable when the loader is attached to the vehicle, a bucket upwardly and downwardly movably connected by pivots to the front ends of the lift arms, and bucket cylinders for moving the buckets, whereby the front loader is adapted to work on the ground. According to the present invention, when the front loader is to be attached to or removed from the vehicle, the bucket as placed on the ground is restrained from moving by restraining members, and the lift arms as disconnected from the vehicle area pivotally moved by the bucket cylinders to an attached position relative to the vehicle or to a removed position above the attached position and can be held in either position. Thus the lift arms can be attached to and removed from the vehicle easily without necessitating the jacks which are conventionally used for raising the lift arms.

Another object of the invention is to reliably hold each lift arm in a position to which the lift arm as disconnected from the vehicle is moved about the pivot by the bucket cylinder and also to provide a stand member which is simple in construction and easy to handle for holding the lift arm in this position.

Another object of the invention is to render the lift arm connectable to the vehicle by a greatly simplified procedure with use of an arrangement comprising a support member provided on each side of the vehicle and an attaching member removably fastened to the support member and adapted to pivotally support the lift arm, the attaching member being connectable to the support member firmly by a simple procedure and with fastening means of simple construction.

Another object of the invention is to provide a restraining member of simple construction for holding the bucket on the ground against movement, for example, by rendering another member of the apparatus usable also as the restraining member.

Still another object of the invention is to provide a front loader attaching apparatus which is tough and easy to handle.

Other objects of the invention will become apparent from the following description with reference to the accompanying drawings.

BRIEF DESCRIPTION OF THE DRAWINGS

FIG. 1 is a side elevation showing a front loader as attached to a tractor by an embodiment of the invention;

FIG. 2 is a front view of the same;

FIG. 3 is a side elevation showing the tractor and the front loader as removed therefrom;

FIG. 4 is a side elevation partly in section and showing an attaching member and other members in the vicinity thereof;

FIG. 5 is a view of the same as they are seen along the line V—V in FIG. 4;

FIG. 6 is a side elevation showing an attaching portion and neighboring parts;

FIG. 7 is a fragmentary enlarged view of FIG. 3;

FIG. 8 is a rear view of FIG. 7;

FIG. 9 is a side elevation partly in section and showing a different example of means for fastening the attaching member to a support member;

FIG. 10 is a side elevation showing a stand member for the front loader;

FIG. 11 is a view showing the stand member as it is seen along the line XI—XI in FIG. 10;

FIG. 12 shows the stand member as accommodated on a lift arm member and as it is seen along the line XI—XI in FIG. 10, the stand member being in a second position different from its first position shown in FIGS. 10 and 11;

FIG. 13 is a side elevation showing another example of stand member for the front loader;

FIG. 14 is a perspective view showing the stand member of FIG. 13 as it is fitted to the lift arm member;

FIG. 15 is a view in section in FIG. 14;

FIG. 16 is a side elevation showing a different example of restraining member;

FIG. 17 is a plan view showing the restraining member as it is seen along the line XII—XII in FIG. 16;

FIG. 18 is a side elevation partly in section and showing another example of fastening means for fastening the attaching member to the support member;

FIG. 19 is a front view showing the same;

FIG. 20 is a view showing a nut and a handle in greater detail; and

FIG. 21 is a side elevation partly in section and showing another example of fastening means for fastening the attaching member to the support member.

DESCRIPTION OF THE PREFERRED EMBODIMENTS

With reference to FIGS. 1 to 8, a tractor body 1 comprises an engine 2, a transmission case 3, etc. The engine 2 is provided with a front axle support 4 projecting forward and is covered with a bonnet 5. Indicated at 6 is a muffler, and at 7 are front wheels.

A front loader 8 comprises a pair of opposite lift arms 10 connected together at their front ends by a connecting member 9, attaching members 12 each connected to the base end of each lift arm 10 by a pivot 11, a pair of opposite lift cylinders 13 each connecting an intermediate portion of each lift arm 10 to the corresponding attaching member 12, a bucket 15 connected to the front ends of the opposite lift arms 10 by pivots 14 and movable upward and downward, a pair of opposite bucket cylinders 16 connecting the intermediate portions of the lift arms 10 to the bucket 15 for pivotally moving the bucket 15, a pair of opposite braces 19 extending forward from the inner sides of the attaching members 12 and provided with a connecting tube 17 and attaching portions 18, a pair of connecting bars 20 connecting the opposite attaching members 12 together, etc. The front loader 8 is removably attached to the front of the tractor by support members 22 provided on main frames 21 and by bearing members 24 mounted on connecting plates 23.

The main frames 21, which are in a pair, are fixed to the opposite sides of the body 1. As shown in FIGS. 4 and 5, a pair of front and rear projecting members 25 extend outwardly sidewise from the front side of each main frame 21 corresponding to the longitudinal midportion of the body 1. The support member 22 is mounted on the outer portions of the projecting members 25. The support member 22 is substantially opposed to the front wheel 7 longitudinally of the front wheel 7 and comprises a rectangular bottom plate 27 fixed to the front and rear projecting members 25, a pair of opposite side plates 28 extending upward from the opposite sides of the bottom plate 27, a forwardly inclined front plate 29 interconnecting the front ends of the side plates 28 and a vertical rear plate 30 for interconnecting the rear ends of the side plates 28. These plates define a downwardly tapered socket portion 22a in the interior of the support member 22.

The attaching member 12 is rectangular in cross section and has at its lower end a tapered fitting portion 31 comprising a bottom plate 32, a pair of opposite side plates 33, a forwardly inclined front plate 34 and a pair of rear plates 35, 36. The fitting portion is tapered downward with a progressively reducing width and is removably fittable into the socket portion 22a of the support member 22 from above, with the two front plates 29, 34, as well as the two rear plates 30, 36, in contact with each other. The front plate 34 of the fitting portion 31 is tangential to a circular arc 37 centered about the pivot 14 on the bucket. When the lift arms 10 are moved about the pivots 14 on the bucket, each attaching member 12 is shifted to an attached position, i.e. fitted position, in which the fitting portion 31 is removably fitted in the socket portion 22a as seen in FIG. 4, or to a removed position or detached position which is above the fitted position and the front wheel 7 and in which the portion 31 is away from the socket portion 22a as shown in FIG. 3. The side plates 33 of the fitting portion 31 have holes 39 extending laterally therethrough for removably inserting the upper end of a stand member 38. Fastening means 40 illustrated as a bolt is inserted through the rear plate 30 of the support member 22 from behind and screwed into the rear plate 36 of the attaching member 12, whereby the attaching member 12 is removably fixed to the support member 22.

As shown also in FIG. 6, the connecting plate 23 extends upward as detachably attached to each side of the front end of the axle support 4 by fastening members 41 illustrated as bolts. The bearing member 24, extending laterally, is fixedly fitted in the upper end of the connecting plate 23. The bearing member 24 is in the form of a channel and comprises front and rear plates 42, 43 and a bottom plate 44 which define a socket groove 24a. The groove is tapered downward when seen sidewise.

The brace 19 is removably attached, by fastening members 46 shown as bolts, to a bracket 45 which is fixed to the inner side of an upper portion of the attaching member 12. The front ends of the opposite braces 19 are interconnected by the connecting tube 17. The connecting tube 17 is fixedly provided at opposite side portions with the attaching portions 18 as fitted to the bottom side of the tube. The attaching portion 18 is in the form of a channel and comprises front and rear plates 47, 48 and a bottom plate 49. The attaching portion is tapered downward with a decreasing width and removably fitted in the bearing member 24, with the two front plates 42, 47, as well as the two rear plates 43, 48, in contact with each other. The front plate 47 of the attaching portion 18 is tangential to a circular arc 50 centered about the pivot 14 on the bucket. When the lift arms 10 are moved about the pivots 14 on the bucket, the attaching portion 18 is shifted to an attached position or fitted position in which the portion 18 is fitted in the socket groove 24a as seen in FIG. 6, or to a removed position or detached position which is above the fitted position and in which the portion 18 is away from the bearing member 24 as shown in FIG. 3. An L-shaped fastening member 51 fixedly provided with a flange 52 at an intermediate portion is inserted through the connecting tube 17 and through the bottom plates 49, 44 of the attaching portion 18 and the bearing member 24 and further screwed into a nut 53 attached to the lower side of the bottom plate 44, whereby the attaching portion 18 is removably fixed to the bearing member 24.

The connecting bars 20 as placed one above the other interconnect the upper ends of the attaching members 12. For this purpose, a pair of fixed plates 54 are provided at the upper ends of the attaching members 12. A holding rod 55 extending upright from each fixed plate 54 is removably inserted through holes 56 at the ends of the connecting bars 20. Indicated at 57 is a retaining pin. When the front loader 8 is to be attached to and removed from the tractor, the connecting bars 20 serve as restraining members which are disposed on the opposite sides of the bucket 15 for restraining the movement of the bucket 15 as seen in FIGS. 7 and 8. For this purpose, fixed plates 59 are attached to the top plate 58 of the bucket 15 at opposite side portions thereof. With each connecting bar 20 bearing on each side plate 60 of the bucket 15, the fastening member 51 is inserted through the connecting bar 20 and the side plate 60 and screwed into the fixed plate 59, whereby the connecting bar 20 is removably fixed to the bucket 15. The side plate 60 of the bucket 15 is further fixedly provided with a pair of front and rear stoppers 61, 62, which bear against the front portion of the connecting bar 20 from below and above, whereby the connecting bar 20 is prevented from moving counterclockwise in FIG. 7 relative to the bucket 15. The connecting bar 20 thus fixed to the bucket 15 extends rearward to engage the ground at its extremity on the outer side of the front wheel 7. The extremity of the bar has a ground plate 63 fixed thereto.

A hydraulic control valve unit 64 for the cylinders 13, 16 is mounted on one of the attaching members 12, connected to the cylinders 13, 16 by hydraulic hoses or the like and also connected separately to the hydraulic unit of the tractor by hydraulic hoses and self-sealing pipe joints which are quickly connectable and disconnectable. Indicated at 64 is a control lever for the unit 64.

The embodiment of the foregoing construction will be handled in the following manner for removing the front loader 8 from the tractor. First, the fastening members 51 are removed from the attaching portions 18 to release the attaching portions from the bearing members 24. The two connecting bars 20 are then removed from the holding rods 55, arranged on the side plates 60 of the bucket 15 outside thereof and fixed thereto by the fastening members 51 to prevent the movement of the bucket 15 relative to the ground by the bars 20 as shown in FIG. 7, etc. The fastening means 40 are further removed to release the attaching members 12 from the support members 22. In this state, the pistons of the bucket cylinders 16 are retracted by the control lever 65 to move the lift arms 10 upward about the pivots 14 on the bucket, thereby shifting the attaching members 12 to the detached position above the front wheels 7 and the attaching portions 18 also to the detached position above the bearing members 24 as shown in FIG. 3. With the present embodiment, the attaching members 12 and the attaching portions 18 are shifted to the specified detached positions when the pistons of the bucket cylinders 16 are retracted to their limit position in order to render the attaching members 12 and the attaching portions 18 so positionable as specified and also to protect the hydraulic hoses connecting the hydraulic control valve unit 64 to the hydraulic unit on the tractor. The stand members 38 are thereafter placed upright on the ground, each with its horizontal upper end inserted through the hole 39 of each fitting portion 31. In this case, the upright portion of the stand member 38 is positioned outside the front wheel 7. Subsequently, the hydraulic cylinders 13, 16 are freed from the hydraulic pressure therein by the control lever 65 to cause the stand members 38 to support the front loader 8 at its rear portion. The hoses connecting the hydraulic control valve unit 64 to the hydraulic unit on the tractor are disconnected from the tractor at the self-sealing quickly disconnectable pipe joints. When the tractor is thereafter reversely driven, the tractor moves rearward without allowing the front wheels 7 to interfere with the attaching members 12, stand members 38, etc., whereby the front loader 8 is completely removed from the tractor. Since the connecting bars 20 are used as the members for restraining the bucket 15 from moving, with the fastening members 51 used for fixing the connecting bars 20 to the bucket 15, for the removing procedure described above, it is in no way likely that the operator will forget to remove the connecting bars 20 or to release the attaching portions 18 from the bearing members 24.

Next, the front loader 8 can be attached to the tractor by a procedure reverse to the above. First, the tractor is advanced toward the front loader 8 as supported by the stand members 38 at its rear portion to position the support members 22 and the bearing members 24 in corresponding relation to the attaching members 12 and the attaching portions 18 respectively as shown in FIG. 3. The hydraulic unit of the tractor is then connected to the control valve unit 64 by the hoses, and the pressure oil is supplied to the bucket cylinders 16 by the control lever 65 to cause the bucket cylinders 16 to support the lift arms 10, etc. The stand members 38 are thereafter removed from the attaching members 12. Subsequently the control lever 65 is manipulated to stretch the pistions of the bucket cylinders 16 and move the lift arms 10 downward about the pivots 14 on the bucket, thereby shifting the attaching members 12 and the attaching portions 18 to their fitted positions as seen in FIG. 1. Because the fitting portions 31 of the attaching members 12 and the attaching portions 18 are tapered to fit into the support members 22 and the bearing members 24 respectively and also because the front plates 34, 47 of the fitting portions 31 and the attaching portions 18 are tangential to the circular arcs 37, 50 centered about the pivots 14 on the backet, the fitting portions 31 are easily guided into the support members 22, with the attaching portions 18 also easily guided into the bearing members 24, as the lift arms 10 are moved downward as above, and the fitting portions 31 and the attaching portions 18 thus advanced are accurately positioned in the support members 22 and the bearing members 24 respectively. The attaching members 12 are then fixed to the support members 22 by the fastening means 40, the fastening members 51 and the connecting bars 20 are removed from the bucket 15, and the attaching portions 18 are fixed to the bearing members 24 by the fastening members 51. Since the fitting portions 31 and the attaching portions 18 are positioned in the support members 22 and the bearing members 24, respectively, as above and as specified, the parts can be fixed with ease. Subsequently the connecting bars 20 are attached to the attaching members 12, whereby the front loader 8 is completely connected to the tractor.

With the front loader 8 attached to the tractor in this way, the tapered fitting portions of the attaching members 12 and the tapered attaching portions 18 of the braces 19 are fitted in the support members 22 and the bearing members 24, respectively, which are also tapered, so that the front loader 8 is connected to the tractor with increased strength. Although the pivots 11 on the attaching members for the lift arms 10 and the braces 19 are loaded in the directions of arrows shown in FIGS. 4 and 6 during the operation of the front loader 8, the tapered fitted portions satisfactorily support these loads.

FIG. 9 shows another structure for fastening the attaching member 12. The projecting members 25 are fixedly provided with a connecting plate 67 on the lower side thereof, while a nut 68 is fixed to the upper side of the bottom plate 32 of the fitting portion 31. L-shaped fastening means 40 fixedly provided with a flange 69 at an intermediate portion is inserted through the connecting plate 67 and the bottom plates 27, 32 of the support member 22 and the fitting portion 31 from below and screwed into the nut 68, whereby the attaching member 12 is removably attached to the support member 22.

The attaching member and the attaching portion, although tapered to fit in the support member and bearing member respectively in the foregoing embodiment, may be adapted to contact the support member and the bearing member simply.

FIGS. 10 to 12 show stand means for the front loader 8. In this case, the attaching member 12 of the front loader 8 is connected to the support member 22 by a flange joint with use of fastening means 40. The attaching member 12 is fixed to the member 22 at a higher level than the front wheel 7. The front end of the brace 19 is attached to the outer side of the connecting plate 23 by a fastening member 77. The connecting member 9 interconnecting the front ends of the opposite lift arms 10 is provided on the rear side thereof with a stand member 78 in the following manner. The stand member 78 comprises an L-shaped support plate 81 including a short plate portion 79 and a long plate portion 80, an engaging rod 82 projecting upward and fixed to the free end of the short plate portion 79, a contact plate 83 fixed to an intermediate portion of the plate portion 79 and parallel to the long plate portion 80, a ground plate 84 fixed to the free end of the long plate portion 80, and a plate spring 85 fixed to an intermediate portion of the long plate portion 80 on the outer side thereof and extending outward. A channel-shaped bracket 86 is horizontally fixed to the rear side of the connecting member 9 at the laterally middle portion thereof. A pin 87 is vertically inserted through a rear side portion of the bracket 86. Inside the bracket 86 on the front side of the pin 87, the support plate 81 is disposed and is movable longitudinally thereof. FIGS. 10 and 11 show the stand member 78 in a support position in which the member 78 supports the front loader 8 with the short plate portion 79 removably held to the connecting member 9 and the long plate portion 80 extending perpendicular to the member 9 rearward between the front wheels 7. Alternatively the support member is in a stored position in which the long plate portion 80 extends along the connecting member 9 on the rear side thereof, with an intermediate portion thereof inserted through the bracket 86 as shown in FIG. 12. An engaging pawl 88 is movably supported on a pivot 89 mounted on the upper side of the connecting member 9 at the laterally midportion thereof and perpendicular to the upper side. The stand member 78 is held in the support position by the pin 87 held between the bent portion of the support plate 81 and the contact plate 83 and by the engaging pawl 88 releasably engaging the engaging rod 82. The engaging pawl 88 is provided with a coiled spring 90 for biasing the pawl 88 into engagement with the rod 82 and holding the pawl 88 in bearing contact with a stopper 91 and out of engagement with the rod. An engaging recess 92 is formed in the rear surface of the connecting member 9 at the left of the bracket 86. The free end of the plate spring 85 disengageably engages in the recess 92 to hold the stand member 78 in its stored position.

FIGS. 13 to 15 show another example of stand means for the front loader 8. In this case, the attaching member 12 of the front loader 8 is connected to the support member 22 by a flange joint with use of fastening means 40. The attaching member 12 is fixed to the member 22 at a higher level than the front wheel 7. The front end of the brace 19 is attached to the outer side of the connecting plate 23 by a fastening member 77. The connecting member 9 interconnecting the front ends of the opposite lift arms 10 is provided on the rear side thereof with a stand member 100 in the following manner. The stand member 100 comprises a support tube 101, a fitting plate 102 fixed to one end of the support tube 101, a ground plate 103 fixed to the other end of the tube 101, a first engaging rod 104 fixed to the support tube 101 at right angles therewith and positioned closer to the fitting plate, and a second engaging rod 105 fixed to the tube 101 at right angles therewith and positioned closer to the ground plate. A C-shaped bracket 106 is horizontally fixed to the rear side of the connecting member 9 at the laterally midportion thereof. With the fitting plate 102 removably fitted in the bracket 106, the stand member 100 is held in a support position in which the member 100 is perpendicular to the connecting member 9 as seen in FIG. 13 and extends rearward between the opposite front wheels 7 to support the front loader 8. A pair of upper and lower plate springs 107 are arranged on the connecting member 9 on the left side of the bracket 106. Each plate spring 107 has a right portion fixed to the connecting member 9 and a left portion bulging rearward to serve as a holding portion 108. As seen in FIG. 14, the stand member 100 is held in a lateral stored position on the rear side of the connecting member 9 by the bracket 106 releasably engaging the first engaging rod 104 and by the holding portions 108 of the plate springs 107 elastically deformed to releasably engage the upper and lower ends of the second engaging rod 105.

FIGS. 16 and 17 show a different restraining member 110 which is independent of the connecting bar 20 and which is adapted to prevent the movement of the bucket 15. In this case, the restraining member 110 is removably disposed between the opposite front wheels 7 under the bucket 15. The restraining member 110 comprises a pair of opposite side plates 111, a connecting plate 112 interconnecting the rear ends of the side plates 111, an X-shaped reinforcement 113 interconnecting the side plates 111, and a pair of engaging pawls 114 fixed to the front ends of the side plates 111 and projecting rearward. A toothed member 115 is disposed at the front opening edge of the bucket 15. Brackets 116 integral with the toothed member 115 at its opposite ends are fixed to the opposite side plates of the bucket 15.

The side plates 111 serve as members for placing the bucket 15 thereon. The toothed member 115 of the bucket 15 on the plates 111 is releasably engaged by the engaging pawls 114, whereby the opening front edge of the bucket 15 is restrained from turning upward as supported on a bucket bottom portion 15a. When the front loader 8 is to be attached to or removed from the tractor, the bucket 15 is placed on the restraining member 110 on the ground, with the toothed member 115 held between the engaging pawls 114 and the main body of the restraining member 110, whereby the bucket 15 is prevented from moving relative to the ground.

FIGS. 18 to 20 show a different example of fastening means 120 for fixing the attaching member 12 to the support member 22. The support member 22 is in the form of a downwardly tapered box comprising a front plate 29, a rear plate 30 and a pair of opposite side plates 28. The front plate 29 is inclined forward, while the other plates 30, 28 are vertical. The support member 22 has a downwardly tapered socket portion 22a in its interior.

The front plate 29 and the rear plate 30 are respectively formed with holes 121, 122 extending therethrough on a front-to-rear horizontal axis. The upper edge defining the hole 121 in the front plate 29 has an engaging piece 123 forwardly folded over. A reinforcing washer 124' surrounding the hole 122 of the rear plate 30 is welded to the plate 30.

The attaching member 12 has at its lower end a tapered fitting portion 31 removably fittable into the socket portion 22a from above. Stated more specifically, the attaching member 12 is rectangular in cross section and has a front plate 34, the lower end of which is slanted so as to be fittable to the inclined front plate 29 of the support member 22.

The front plate 34 and the rear plate 36 of the fitting portion 31 are formed with openings 124, 125 which are in register with the holes 121, 122 of the support member 22 when the fitting portion 31 is fitted in the socket portion 22a. A rearwardly folded-over engaging piece 124a is formed at the lower edge of the front plate 34 defining the opening 124.

A cotter bolt 126 is withdrawably inserted through the holes 121, 122 and the openings 124, 125 to fix the attaching member 12 to the support member 22.

The cotter bolt 126 comprises a wedge portion 128 having a rectangular cross section and a slanting lower edge 127, and a bolt portion 129 extending from the tapered end of the wedge portion 128 and having a circular cross section.

The slanting edge 127 of the wedge portion 128 bears on the engaging piece 124a of the attaching member 12, while the upper edge of the wedge portion 128 is in contact with the engaging piece 123 of the support member 22. The bolt portion 129 extends rearwardly outward through the opening 125 and the hole 122 of the rear plates 36, 30 of the attaching member 12 and the support member 22. The upper surface of the bolt portion 129 bears against the upper edge of the rear plate 30 defining the hole 122. A nut 131 having a tubular portion 130 is screwed on the projecting bolt portion 129. Another nut 132 is screwed on the bolt portion 129 for preventing the nut 131 from loosening. Each of the nuts 131; 132 is provided with a turning handle 133.

With the above arrangement, the attaching member 12 is fixed to the support member 22 by fitting the fitting portion 31 of the attaching member 12 into the socket portion 22a of the support member 22, thereafter inserting the cotter bolt 126 through the holes 121, 122 and through the openings 124, 125 from the front and tightly screwing the nuts 131, 132 on the rearwardly projecting bolt portion 129.

The nut 131, when thus tightened up, causes the slanting edge 127 of the cotter bolt wedge portion 128 to bear against the engaging piece 124a at the opening 124 and the upper edge of the wedge portion 128 against the engaging piece 123 at the hole 121, while causing the upper surface of the bolt portion 129 to bear against the portion of the rear plate 30 defining the hole 122, whereby the attaching member 12 is depressed. Thus the fitting portion 31 is intimately fitted into the socket portion 22a.

Accordingly, the attaching member 12 can be connected to the support member 22 quickly, easily and firmly merely by fitting the member 12 into the member 22 and tightening up the cotter bolt 126.

FIG. 21 shows another example of fastening means 120 for fixing the attaching member 12 to the support member 22. In place of the engaging pieces 123 and 124a, rod members 134, 134 are welded to the same portions.

According to the embodiments shown in FIGS. 18 to 21, the threaded bolt portion 129 is protected from damage by being covered with the tubular portion 130 of the nut 131. The hole 121 formed in the front plate 29 of the support member 22 is rectangular and therefore serves to hold the cotter bolt 126 against rotation when the nuts 131, 132 are tightened up. The nuts 131, 132, which have the handles 133, can be tightened up firmly without the necessity of using a spanner or the like.

What is claimed is:

1. An apparatus for attaching a front loader to a vehicle comprising:
    a pair of opposite lift arms removably connectable to the vehicle and pivotally movable upwardly and downwardly,
    a bucket supported by a front end of each of the lift arms with a pivot and pivotally movable upwardly and downwardly,
    bucket cylinders for pivotally moving the bucket,
    a restraining member removably attached to the bucket for preventing the pivotal movement of the bucket relative to the ground,
    a support member provided at each side of the vehicle, and
    an attaching member removably fixed to each support member by fastening means, each lift arm being supported by the attaching member and being pivotally movable upwardly and downwardly, the attaching members being detachably connected together by a connecting bar, the connecting bar being serviceable also as the restraining member;
    the lift arms, when disconnected from the vehicle, being shiftable to an attached position relative to the vehicle or a removed position thereabove by being moved about the pivots by the bucket cylinders and holdable in either position.

2. An apparatus as defined in claim 1 wherein the support member is formed with a downwardly tapered socket portion, and the attaching member has a tapered fitting portion removably fittable into the socket portion from above, whereby the attaching member is removably fitted to the support member.

3. An apparatus as defined in claim 2 wherein the fastening means comprises a cotter bolt withdrawably inserted through the socket portion and the fitting portion to intimately fit the fitting portion in the socket portion.

4. An apparatus as defined in claim 2 wherein a bearing member is provided at each side of the vehicle in front of the support member, and a brace extends forward from the attaching member, the forward end of the brace being removably fixed to the bearing member.

5. An apparatus as defined in claim 4 wherein the bearing member is formed with a downwardly tapered socket groove, and the forward end of the brace is provided with an attaching portion removably fittable into the socket groove, the attaching portion being removably held in the socket groove by fastening means.

6. An apparatus as defined in claim 3, wherein the cotter bolt comprises a wedge portion having a rectangular cross section and a slanting edge, and a bolt portion extending from the tapered end of the wedge portion and having a circular cross section and a threaded portion, said fastening means further comprising a first nut threadingly screwable on the bolt portion and having a tubular portion thereon, and a second nut threadingly screwable on the bolt portion for locking the first nut thereon.

7. An apparatus as defined in claim 6, wherein each first nut and each second nut has a turning handle provided thereon.

8. An apparatus for attaching a front loader to a vehicle comprising:
- a pair of opposite lift arms removably connectable to the vehicle and pivotally movable upwardly and downwardly,
- a bucket supported by a front end of each of the lift arms with a pivot and pivotally movable upwardly and downwardly,
- bucket cylinders for pivotally moving the bucket, and
- a restraining member removably attached to the bucket for preventing the pivotal movement of the bucket relative to the ground;
- the lift arms, when disconnected from the vehicle, being shiftable to an attached position relative to the vehicle or a removed position thereabove by being moved about the pivots by the bucket cylinders and holdable in either position;
- the lift arms being holdable by a stand member in the position to which the lift arms are moved about the pivot,
- the stand member including a bracket on a cross member connecting the lift arms and a support tube having at one end thereof a fitting plate and at the other end thereof a ground plate, the fitting plate being removeably engageable with the bracket and the ground plate being engageable with ground to hold the lift arms.

9. An apparatus for attaching a front loader to a vehicle comprising:
- a pair of opposite lift arms removably connectable to the vehicle and pivotally movable upwardly and downwardly,
- a bucket supported by a front end of each of the lift arms with a pivot and pivotally movable upwardly and downwardly,
- bucket cylinders for pivotally moving the bucket, and
- a restraining member removably attached to the bucket for preventing the pivotal movement of the bucket relative to the ground;
- the lift arms, when disconnected from the vehicle, being shiftable to an attached position relative to the vehicle or a removed position thereabove by being moved about the pivots by the bucket cylinders and holdable in either position;
- the lift arms being holdable by a stand member in the position to which the lift arms are moved about the pivot,
- the stand member comprising an L-shaped support plate including a short plate portion and a long plate portion, the lift arms being holdable by the stand member with the short plate portion removably held to a cross-member connecting the lift arms and the long plate portion engaging the ground with its free end, the support plate being holdable to the cross member for storage with the long plate portion removably attached thereto.

10. An apparatus for attaching a front loader to a vehicle comprising:
- a pair of opposite lift arms removably connectable to the vehicle and pivotally movable upwardly and downwardly,
- a bucket supported by a front end of each of the lift arms with a pivot and pivotally movable upwardly and downwardly,
- bucket cylinders for pivotally moving the bucket,
- a restraining member removably attached to the bucket for preventing the pivotal movement of the bucket relative to the ground,
- a support member provided at each side of the vehicle, and an attaching member removably fixed to each support member by fastening means, each lift arm being supported by the attaching member and being pivotally movable upwardly and downwardly;
- the lift arms, when disconnected from the vehicle, being shiftable to an attached position relative to the vehicle or a removed position thereabove by being moved about the pivots by the bucket cylinders and holdable in either position;
- the restraining member comprising a member for placing the bucket thereon and a pawl for releasably engaging a front opening edge of the bucket when the bucket is placed on the placing member to prevent the front edge from moving upward as supported at a bottom portion of the bucket.

11. An apparatus as defined in claim 10 wherein the support member is formed with a downwardly tapered socket portion, and the attaching member has a tapered fitting portion removably fittable into the socket portion from above, whereby the attaching member is removably fitted to the support member.

12. An apparatus as defined in claim 11 wherein the fastening means comprises a cotter bolt withdrawably inserted through the socket portion and the fitting portion to intimately fit the fitting portion in the socket portion.

13. An apparatus as defined in claim 11 wherein a bearing member is provided at each side of the vehicle in front of the support member, and a brace extends forward from the attaching member, the forward end of the brace being removably fixed to the bearing member.

14. An apparatus as defined in claim 13 wherein the bearing member is formed with a downwardly tapered socket groove, and the forward end of the brace provided with an attaching portion removably fittable into the socket groove, the attaching portion being removably held in the socket groove by fastening means.

15. An apparatus as defined in claim 12 wherein the cotter bolt comprises a wedge portion having a rectangular cross section and a slanting edge, and a bolt portion extending from the tapered end of the wedge portion and having a circular cross section and a threaded portion, said fastening means further comprising a first nut threadingly screwable on the bolt portion and having a tubular portion thereon, and a second nut threadingly screwable on the bolt portion for locking the first nut thereon.

16. An apparatus as defined in claim 15 wherein each first nut and each second nut has a turning handle provided thereon.

* * * * *